No. 858,447. PATENTED JULY 2, 1907.
A. C. FITZ.
REVERSE MECHANISM.
APPLICATION FILED JUNE 22, 1906.
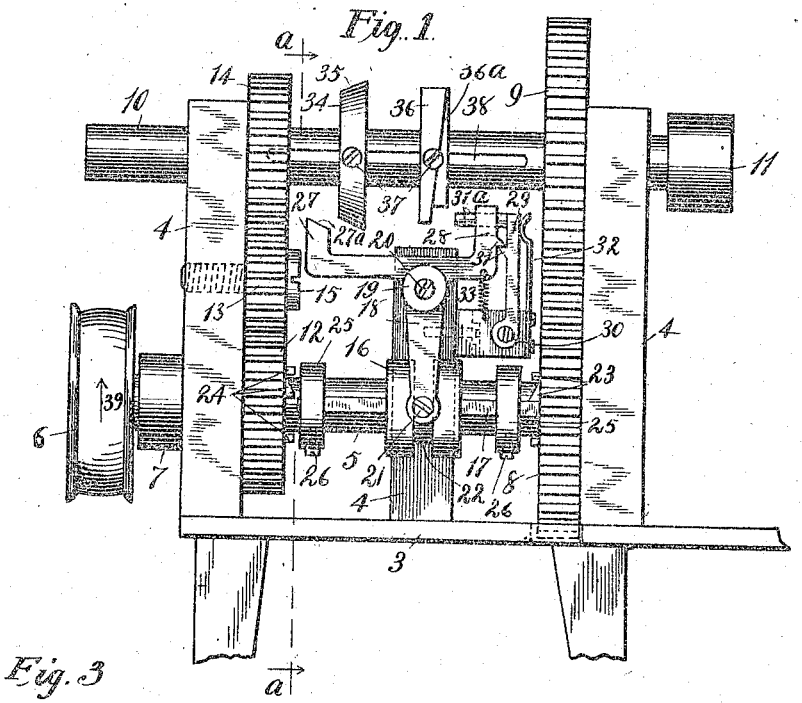
Fig. 1.
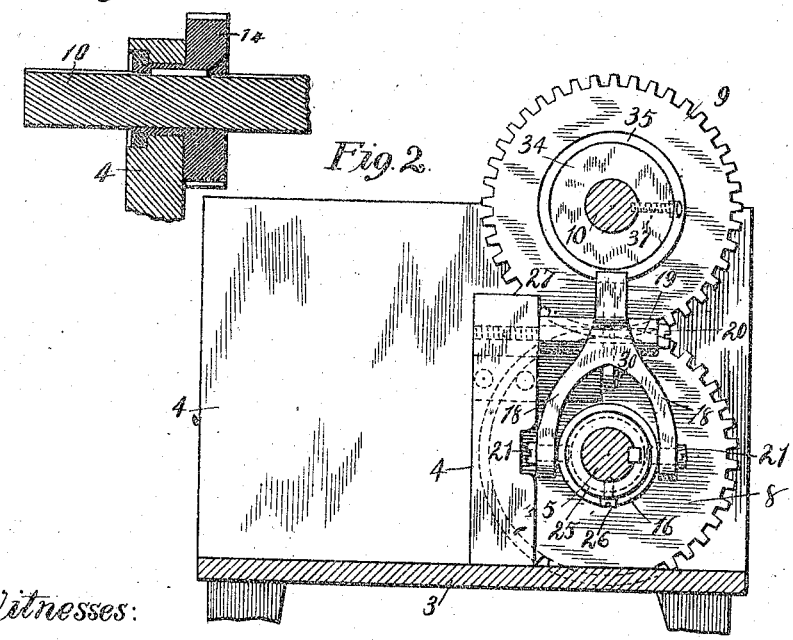
Fig. 3.
Fig. 2.
Witnesses:
Chas. F. Bassett
M. Marty
Inventor
Amos C. Fitz
By Frederick Benjamin
Atty.

UNITED STATES PATENT OFFICE.

AMOS C. FITZ, OF PULLMAN, ILLINOIS.

REVERSE MECHANISM.

No. 858,447.  Specification of Letters Patent.  Patented July 2, 1907.

Application filed June 22, 1906. Serial No. 322,828.

*To all whom it may concern:*

Be it known that I, AMOS C. FITZ, a citizen of the United States, residing at Pullman, in the county of Cook and State of Illinois, have invented certain new and useful Improvements in Reverse Mechanism, of which the following is a specification.

My invention relates to automatic screw machines and has special reference to mechanism for reversing the motion of the spindle.
The chief objects of my improvement are to provide an apparatus for quickly reversing the direction of rotation of the spindle and to accomplish the desired result without producing a sudden jar or shock.

Further objects are to produce a simple apparatus for the purpose specified having few parts thus rendering the mechanism durable and efficient, and to so design the parts that the reversing lever will have a minimum throw.

I accomplish these results by the use of the mechanism illustrated in the accompanying drawing which forms a part of this specification, and in which:—

Figure 1 is a side elevation of a portion of a screw machine, showing my improved automatic reversing mechanism attached thereto; Fig. 2 is a sectional view on the line a—a of Fig. 1; Fig. 3 is a detail sectional view, clearly showing the connection between the gears and spindle.

Referring to the drawing the numeral 3 indicates the bed of the machine which supports the frame 4, in which is journaled the main shaft 5 carrying a driving pulley 6, and a retaining collar 7. A gear wheel 8 is loosely mounted upon the shaft 5 and is in mesh with a gear 9 keyed to a spindle 10 which is journaled in the frame 4 in such a manner as to permit it to have a longitudinal movement in its bearings. Said spindle has mounted upon one end a chuck 11 which carries the cutting die. In addition to the gear 8 the shaft 5 carries another loose gear wheel 12, which meshes with an intermediate pinion 13, and this in turn with a gear 14 keyed to the spindle 10 in the same manner as the gear 9. The gears 9 and 14 are operatively connected to the spindle so as to transmit rotary motion thereto by means of keys or feathers which are received in a longitudinal groove or spline cut in the said spindle. Each of said gears is also furnished with a quill or hollow sleeve which projects through the frame 4 and is journaled therein and at the end is furnished with threads to receive a retaining collar, the face of the bearing opposite to the gear being counterbored to admit the said collar so that it is flush with the surface of the frame as shown in Fig. 3. This construction will permit of the free rotation of the gears in connection with the spindle and at the same time allow the latter to be reciprocated in the direction of its length while the said gears remain longitudinally stationary. The gear 13 is secured to the frame by a stud 15. Upon the shaft 5, about midway between the gears 8 and 12 is mounted a sleeve 16 in which is secured a spline 17 extending longitudinally to the shaft, its length being somewhat less than the distance between the said gears 8 and 12. The sleeve 16 is reciprocated on the shaft 5 by means of a forked lever, having arms 18 formed integral with a bearing 19 and pivotally connected to the frame 4 by means of a stud 20. The ends of the arms 18 are provided with screw lugs 21 the ends of which engage an annular groove 22 in the sleeve 16. The gears 8 and 12 are provided with spaced lugs 23, 24, which project from the opposing faces of said gears in close proximity to the shaft upon which they are mounted. These lugs are adapted to engage the ends of the spline 17 when the latter is reciprocated.

In order to render the spline more rigid collars 25 are secured to the shaft by set screws 26. These collars permit the free longitudinal movement of the spline, but prevent lateral displacement. Formed integral with the bearing 19 are two arms 27, 28; the former provided with an inclined face 27ᵃ. A vertical lever 29 is pivoted to a projection on the frame by a shouldered screw 30. The arm 28 and the lever 29 are provided with angular stops 31 which are adapted to engage each other when the arm and lever are in the position shown in Fig. 1. From the upper end of the lever 29 a pin 31ᵃ projects through a notch in the upper part of the arm 28. The said lever 29 is held in extended position, as shown in Fig. 1 by a flat spring 32 secured to the frame. A spring 33 secured to the arm 28 tends to rock the conjoined arms 18, 27 and 28 against the resistance of the angular stops 31.

Upon the spindle 10 is secured an operating cam 34 in the form of a disk having a beveled face 35. Upon the same spindle is mounted a release cam 36 having a spirally inclined contact surface 36ᵃ. The cams 34 and 36 are adjustably secured to the spindle by set screws 37, the points of which engage a longitudinal groove 38 in the spindle.

The operation of the device is as follows:—When the spline 17 is in engagement with the lugs 23 of the gear element 8, as shown in Fig. 1, the motion of the shaft 5, which always rotates in the direction of the arrow 39 will turn the spindle in the opposite direction through the medium of the gears 8 and 9. The chuck 11 when engaged in the work of cutting a screw is automatically fed to the right. The release cam 36 is so adjusted with relation to the mechanical movements that the spiral face 36ᵃ will make contact with the pin 31ᵃ at the proper time to release the stops 31 from their mutual engagement when the spring 33 will instantly depress the arm 28 and rocking the conjoined arms 18 and 27, whereby the spline 17 will be thrown out of engagement with the lugs 23 of the wheel 9 and moved sufficiently to the left to engage, by its opposite end, the lugs 24 of the gear wheel 12, and through the medium of the train of gears 12, 13, 14, will cause a reverse movement of the spindle, and the chuck being in engagement with the thread of the screw which it formed when turning to the right will be automatically retracted from the work until the inclined face 35 of the cam 34 makes contact with the inclined face 27ª of the arm 27. The latter will then be depressed and the arms 18 rocking in unison therewith will reciprocate the spline 17 releasing it from engagement with the gear 12 and bringing it into operative engagement with the gear 8, thus again reversing the movement of the spindle. This automatic alternate reversal of the spindle will be brought about with a minimum amount of jar since the impact of the inclined faces of the cams will be graduated by their shape. The adjustability of the cams will be found of great advantage by allowing of a variation in the travel of the spindle.

Having thus described my invention what I claim, is:—

1. A reverse mechanism including a spindle, a driving shaft having a plurality of loose gears mounted thereon, said gears being provided with a series of lugs, operative connections between said gears and the spindle, a sleeve adapted for longitudinal movement upon said shaft, a spline secured to said sleeve and adapted to engage said lugs, an operating lever for said sleeve, means for operating said lever, a detent for the lever in one of its positions, and means attached to the spindle for releasing said detent.

2. A reverse mechanism including a spindle, a driving shaft having a plurality of loose gears mounted thereon, said gears being provided with a series of laterally projecting lugs, operative connections between said gears and the spindle, a grooved sleeve adapted for longitudinal movement upon said shaft, a spline secured to said sleeve and adapted to engage said lugs, a rocking lever for operating said sleeve, yielding means for rocking said lever, a yielding detent for the lever in one of its positions, a cam disk carried by the spindle and adapted to release said detent and means for automatically engaging said detent with the lever.

3. A reverse mechanism including a spindle, a driving shaft having a plurality of loose gears mounted thereon, said gears having laterally projecting lugs, operative connections between the gears and the spindle, a grooved sleeve adapted for longitudinal movement upon said shaft a spline secured to said sleeve and adapted to engage said lugs, a rocking lever for operating said sleeve, means for rocking said lever in one direction, yielding means for rocking the lever in the opposite direction, a detent for retaining said lever in one of its positions, a cam disk carried by the spindle and adapted to release said detent, and means for adjusting said cam disk longitudinally on the spindle.

4. A reverse mechanism including a spindle, a driving shaft carrying a plurality of loose pulleys, a grooved sleeve adapted for longitudinal movement on said shaft, a pawl secured to said sleeve and adapted to engage lateral teeth in said loose gears, a rocking lever for operating said sleeve, a disk mounted upon said spindle and adapted to engage said lever, a spring for the lever, a detent for holding said lever against the action of its spring, a cam disk carried by the spindle and adapted to engage and release said detent, a spring for the detent and means for adjusting said disks upon the spindle.

5. A reverse mechanism including a spindle, a driving shaft carrying a plurality of loose gears, gear connections between the said gears and the spindle, a grooved sleeve mounted upon the shaft and adapted for longitudinal movement, a pawl secured to said sleeve, a rocking lever for operating the sleeve, a beveled disk carried by the spindle and adapted to engage an inclined face on said lever, a locking detent to hold said lever in one of its positions, and a disk having a cam face carried by the spindle and adapted to release said detent from engagement with the lever.

6. A reverse mechanism including a spindle, a driving shaft carrying a plurality of loose gears, operative connections between the gears and the spindle, a grooved sleeve mounted upon the shaft and adapted for longitudinal movement thereon, a pawl secured to said sleeve and adapted to engage teeth on said gears, a rocking lever for reciprocating the sleeve, a beveled disk mounted on the spindle and adapted to engage an inclined face on said lever, a detent for said lever, a cam wheel carried by the spindle and adapted to release said detent from engagement with the lever, and means for adjusting said disk and cam wheel longitudinally on said spindle.

In testimony whereof I affix my signature in presence of two witnesses.

AMOS C. FITZ.

Witnesses:
WILLIAM O. TUCK, Jr.,
H. W. GALLEY.